United States Patent [19]

Schlipalius et al.

[11] Patent Number: 4,803,090
[45] Date of Patent: Feb. 7, 1989

[54] PROCESS FOR PRODUCING A MICROWAVE PUFFED CHEESE SNACK

[75] Inventors: Lance E. Schlipalius, Victoria, Australia; Jeffrey J. Myers, DesPlaines; Jonathan P. Frey, Arlington Heights, both of Ill.

[73] Assignee: Kraft, Inc., Glenview, Ill.

[21] Appl. No.: 930,647

[22] Filed: Nov. 13, 1986

[30] Foreign Application Priority Data

Nov. 13, 1985 [AU] Australia ............................... PH3387

[51] Int. Cl.<sup>4</sup> ..................... A23C 19/086; A23C 19/09
[52] U.S. Cl. ...................................... 426/242; 426/582
[58] Field of Search ........................ 426/242, 582, 580

[56] References Cited

U.S. PATENT DOCUMENTS

| | | | |
|---|---|---|---|
| 2,571,765 | 10/1951 | Ruys | 426/582 |
| 3,520,701 | 7/1970 | Rendek et al. | 426/242 |
| 3,978,236 | 8/1976 | Sair et al. | 426/242 |
| 3,978,244 | 8/1976 | Sair | 426/242 |
| 4,719,118 | 1/1988 | Thomas | 426/580 |

FOREIGN PATENT DOCUMENTS 2925372  1/1981  Fed. Rep. of Germany ...... 426/582

Primary Examiner—Donald E. Czaja
Assistant Examiner—Mary S. Mims
Attorney, Agent, or Firm—Fitch, Even, Tabin & Flannery

[57] ABSTRACT

Process, for producing a dry, crips, puffed natural butterfat containing cheese snack in which cheese snack precursor pieces having a fat content of 17–34% and a moisture content of 20–50% are both baked in a convection oven and subjected to microwave cooking to puff and dry pieces.

6 Claims, 1 Drawing Sheet

PROCESS FOR PRODUCING A MICROWAVE PUFFED CHEESE SNACK

This invention relates to methods for the production of snack food products, especially such products made from cheese.

BACKGROUND OF THE INVENTION

Snack foods are of considerable economic importance, but despite their popularity they have been widely criticized for their low nutritional value. Although some 'cheese' snacks are available, they actually consist predominantly of cereal, with a cheese coating or flavouring.

SUMMARY OF THE INVENTION

We have now found that it is possible to produce a dried leavened snack or biscuit from a cheese or cheese-based starting material by using a microwave heating process. All-natural cheese or processed cheese may be used. Other components such as fruits, vegetables, cereals, meats, eggs, and smallgoods may be added.

We have also found that a similar product may be made from other fat and protein ingredients which give the leavening result required. For example, certain soy isolates, glutens or caseinates may be combined with vegetable oils such as soybean, sunflower, safflower or palm oil, together with the other components and water to form an emulsion, which is then dried by microwave heating in the same way as for cheese.

According to one aspect of the present invention there is provided a dried, leavened cheese snack food product. Preferably the cheese is a processed cheese, or a processing step is included.

According to another aspect of the invention there is provided a dried, leavened cheese snack food product which additionally includes a cereal, carbohydrate, fruit or vegetable product.

According to a third aspect of the invention, there is provided a dried leavened snack food product which is made from a mixture of a protein, selected from the group including soybean proteins, glutens, caseinates and similar proteins, and a vegetable oil selected from the group including soybean, sunflower, safflower, peanut, and palm oil, together with water and colouring and flavouring components.

There is also provided a process for producing the said snack food product, comprising the steps of:
(a) Forming an emulsion of processed cheese or of protein and oil.
(b) Depositing the hot emulsion on to a surface.
(c) Subjecting the emulsion to a microwave cooking and drying step.
(d) Cooling the cooked, dried product.

The moisture content is reduced to less than 5%, preferably to less than 3%, most preferably to less than 2%.

The microwave cooking and drying step and the cooling step may be performed as a batch process or as a continuous process.

The microwave step may optionally be combined with a convection heating step.

Previously made processed cheese cut from a block or from slices, optionally preformed to a desired shape or size may be subjected to the drying and leavening process of step (c).

The microwave frequency used is in the range $915\pm25$ to $22,125\pm125$ megacycles/second, preferably $915\pm25$ to $5,800\pm$megacycles/second, and still more preferably $2,450\pm50$ megacycles/second.

DETAILED DESCRIPTION OF THE INVENTION

We observed that subjecting natural or processed cheese to heating by microwaves in a conventional domestic microwave oven resulted in the drying of the cheese to form a product which was crisp and light textured, due to a unique leavening which occurred in the heating process. The product has a pleasant mild cheese flavour with a slightly grilled note. The microwave heating was continued until drying to a moisture content of less than 5% was effected, with the time being a function of the water content of the cheese to be dried. The cheese may be a cheese base material such as disclosed in application entitled "Manufacture of Cheese and Curd" published by EPC as Pub. No. 0174846 on Mar. 19, 1986; published by Japan as Pub. No. 8839/86 on May 7, 1986; and granted by Spain as No. 546836 on Nov. 25, 1985, incorporated herein by reference. No "oiling-off" occurs during production under appropriate conditions.

There is no burning or darkening of the product, and little oil is lost during preparation.

The process was tried again in a conventional convection oven without microwaving, but no leavening resulted and a hard product with poor appeal resulted. However, subsequent microwaving of the hard product of convention oven treatment yielded a desirable, puffed product. Convection and microwave heating may also be employed simultaneously to prepare an expanded cheese product of low-moisture content and low bulk density.

We believe that the microwave heating process is more effective with processed cheese than with natural cheese, because the fat in the processed cheese is present in a more emulsified state.

The product is preferably a dried leavened processed cheese snack or biscuit type of product. It can be entirely composed of processed cheese, or can be a mixture of processed cheese together with cereal components, vegetables, fruits etc. The product is made by firstly preparing processed cheese by conventional technology, and then adding in any other ingredients while the cheese is still hot. The product may then be cooled and cast into slices or units, which can be subsequently leavened and dried. Alternatively the hot material may be leavened and dried immediately.

The unique leavening and drying process is achieved by a microwave oven technique which imparts the appealing structure and texture to the product. The product cannot be produced by a conventional baking process without microwave energy input. It appears that heating induced by the microwave irradiation causes the cheese to melt, and that concomitant or subsequent evolution and expansion of steam from water present in the cheese causes the protein of the cheese to form expanded cells. The steam then escapes. The process appears to be similar to that occurring during the rising of bread, where gluten forms the cells.

The appearance of a typical example of the resulting product is illustrated in the accompanying drawings, in which.

Figure 1:
FIG. 1 represents a perspective view from above.
Figure 2:
FIG. 2 represents a view from above.
Figure 3:
FIG. 3 represents a view from the side.
Figure 5:
FIG. 5 represents a cross-sectional view, taken at 5—5' in FIG. 2.
Figure 4:
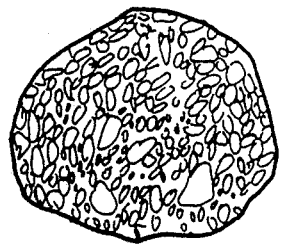
FIG. 4 represents a view from below.

The composition of the processed cheese mixture would be preferably in the following range, allowing for other wholesome foods to be added to the cheese base:

| Moisture content | 20% to 50% |
| --- | --- |
| Fat content | 0 to 70% |
| Protein content | 0 to 40% |
| Carbohydrate content | 0 to 70% |
| Mineral content | 0 to 17.5% |

The fat may originate from various sources, both of animal and vegetable origin. Similarly, the protein and carbohydrate may be derived from animal or plant sources. Cereal components may be added to the cheese base to reduce the formulation cost. The carbohydrate may be simple sugars or complex chains of both digestible and indigestible material.

Typical moisture and fat contents of natural cheeses and non-starch, non-standard low fat cheeses which may be used are in the range 33–50% for moisture, and 17–34% for fat.

The mineral content includes mineral derived from cheese and other ingredients as well as added minerals for functional and nutritional purposes such as processed cheese emulsifiers and leavening agents.

A low-fat cheese starting material has been successfully used to allow a reduction in levels of sodium-based emulsifiers in a successful, expanded, dried cheese product; alternatively non-sodium emulsifiers such as calcium citrate, potassium citrate or dipotassium phosphate may be used.

So far, the ovens used for the process have been producing microwaves in the 2450 megacycles band. This is the major wavelength used in such ovens, and the manufacturers do not make to other frequencies. However, the International Radio Regulations adopted at Geneva in 1959 provided the following frequencies for industrial scientific and medical applications, which include microwave heating for food products. The frequencies are:
915±25 megacycles/second
2,450±50 megacycles/second
5,800±75 megacycles/second
22,125±125 megacycles/second The frequency used is not critical, provided that sufficient energy is supplied in order to induce heating of the water in the starting material.

The method is suitable to be incorporated into a continuous process. A combined microwave/convection heating process is also within the scope of the invention.

The finished product may for example be packed in foil or cellophane in an inert gas atmosphere, in a similar manner to that commonly used for packing potato crisps.

The invention will be further illustrated by reference to the following non-limiting examples.

EXAMPLE 1

In this example, the product was made from natural cheese components, incorporating the processing of the cheese in the snack production, in accordance with the following steps:

1. Assembling the required types and weights of cheese for the product to provide the required body and flavour to the product.
2. Grinding the cheese to a particle size less than 5 mm, typically 3 mm.
3. Blending the ground cheese types in a suitable mechanical blender; adding the emulsifying salts, sodium phosphates or sodium citrate at the rate of 1.0 to 3.5% in total and typically 2.5% of the finished blend.
4. Adding the required condiments, flavours and other ingredients to the blender together with the calculated amounts of water, fat, salt and other condiments to be standardized to obtain the finished product specifications.
5. Blending to gain uniformity.
6. Cooking the product in acceptable batch or continuous equipment to generate a processed cheese emulsion which was done at temperatures between 70° and 150° C., depending on the time of hold and the equipment selected. Typically this could be done in a cheese processing kettle heated to 90° C.
7. The processed cheese emulsion was then deposited hot at 50° to 90° C., typically 71° C., onto a belt with or without the application of a release agent. The weight and size of the deposited units will be governed by the weight and size of the finished product, but typically deposits of about 5 grams are made to yield finished units of about 3 grams in weight.
8. The belt was moved through a continuous microwave oven or combination microwave and convection oven in order to produce the leavening and the drying to the finished snack product.
9. The units were then cooled and packaged using normal packing equipment for dried snack types of products. Packaging to restrict the entry of moisture and oxygen is normally used to ensure the freshness of the product.

EXAMPLE 2

Flat cheese snacks were produced from Swiss processed cheese, cheddar, Colby, an processed low-fat cheese. Hot viscous drops and cold links of processed cheese which had been sliced or diced were microwaved in a commercial microwave oven in a continuous process at high power to less 2% moisture, yielding flat, crunchy chips with full cheese flavour. The yield was 65%, fully accounting for the loss of moisture.

EXAMPLE 3

Puffed cheese snacks were produced from processed cheddar cheese, and also from low-fat processed cheese by a two-step combined convection oven/microwave process. Hot viscous drops and cold links of processed cheese, and low-fat cheese which have been sliced or diced, were baked in a convection oven until the cheese was partially dried, forming a hardened surface skin (135° C., 30 minutes). This partially dried product was then microwaved to less than 2% moisture. The resulting escape of water vapor caused the cheese solids to form a network of thin walled interior micellar pockets or irregular configurations. This product had a low bulk density and was very crisp with a full cheese flavour.

Both the flat and puffed type snacks described in Examples 2 and 3 were produced using processed cheese hot, directly from the cooker, as starting material.

The products of the above processes had the following appearance and taste:

| | |
|---|---|
| Swiss processed cheese-flat type (also could be cheddar or Colby) | flat, lacy appearance definitive cheese flavour |
| Low fat Colby | slightly mounded appearance somewhat hard and chewy |
| Processed Cheddar Cheese puffed type | puffed with hollow centres very crisp, definitive cheddar flavour |

EXAMPLE 4

Pieces of preformed cooled processed cheese may be cut from a block or slices for applying to the microwave/convection oven process for leavening and drying in the same way as described above. In addition, the processed cheese pieces may be preformed to a desired size and shape for drying and leavening at a later date.

EXAMPLE 5

In addition to making the product from cheese, a similar finished product may also be made from other fat and protein ingredients which give the leavening result required. For example, certain soy isolates, glutens, or caseinates may be combined with vegetable oils such as soybean, sunflower, safflower or palm oils, together with the other components and water which form an emulsion which is then dried according to the process of Example 1.

TYPICAL COMPOSITION OF THE SNACK

The following is the typical composition of a product made from processed cheddar cheese using the technique described in Examples 1 and 5.

| Component | Composition by Analysis |
|---|---|
| Water | 2.2% |
| Fat | 46.6% |
| Salt | 4.3% |
| pH of a 10% suspension | 5.4 |
| Protein | 37.4% |
| Carbohydrate (as glucose) | 0.8% |
| Ash | 9.6% |
| Sodium | 3.1% |

| Component | Composition by Analysis |
|---|---|
| Potassium | 0.11% |
| Calcium | 0.94% |
| Phosphorus | 0.82% |
| Zinc | 44 ppm |
| Iron | 12 ppm |
| Copper | 7 ppm |

Cheese types which may be used include cheddar, processed cheddar, Colby, low-fat Colby, Swiss, processed Swiss, cheddar smooth melt, Monterey Jack low-fat cheese.

It will be clearly understood that the invention in its general aspects is not limited to the specific details referred to hereinabove.

I claim:

1. A process for producing a dry, crisp, puffed, natural butterfat containing cheese snack food product without oiling off comprising the steps of
   (a) forming hot viscous drops of cheese base material or processed cheese or slicing or dicing natural cheese, cheese base material or process cheese into pieces to provide cheese precursor pieces having a fat content in the range of 17-34 weight percent, and a moisture content of 20-50%,
   (b) depositing the precursor pieces on to a surface,
   (c) baking the precursor pieces in a convection oven,
   (d) simultaneously or subsequent to said baking, subjecting the precuror pieces to a microwave cokking and drying step to puff the pieces without oiling off, in which the moisture content of the puffed product is less than 5% of that of the starting precursor pieces, and
   (e) cooling the cooked, dried, puffed product.

2. A process according to claim 1, in which the cheese is processed cheese taken directly from a processing cooker.

3. A process according to claim 1 in which the moisture content of the product is less than 2% of that of the sttarting material.

4. A process in accordance with claim 1 wherein said cheese precursor pieces are processed cheese pieces.

5. A process in accordance with claim 1 wherein said cheese precursor pieces are cheese base material pieces.

6. A process in accordance with claim 1 wherein said cooked, dried, puffed cheese snack pieces are packaged in a dry, inert atmosphere in a sealed package.

* * * * *